United States Patent [19]

Espenscheid

[11] 4,177,079

[45] Dec. 4, 1979

[54] ASPHALTIC PAVING COMPOSITIONS AND METHOD OF PREPARATION FROM SOLID ORGANIC WASTES

[75] Inventor: Wilton F. Espenscheid, De Soto, Tex.

[73] Assignee: Mobil Oil Corporation, New York, N.Y.

[21] Appl. No.: 897,997

[22] Filed: Apr. 20, 1978

[51] Int. Cl.$^2$ .............................................. C08L 95/00
[52] U.S. Cl. ................................. 106/274; 260/2.3; 260/28.5 AS; 260/718; 260/719
[58] Field of Search ............... 106/274; 260/2.3, 718, 260/719, 28.5 AS; 201/2.5, 20, 44; 208/8 LE

[56] References Cited

U.S. PATENT DOCUMENTS

| 3,317,447 | 5/1967 | Black et al. | 106/274 |
| 3,733,255 | 5/1973 | Appell et al. | 201/2.5 |
| 3,843,339 | 10/1974 | Saito | 201/2.5 |

*Primary Examiner*—J. Ziegler
*Attorney, Agent, or Firm*—Charles A. Huggett; Raymond W. Barclay

[57] ABSTRACT

Asphaltic compositions comprising waste material are obtained by heating a mixture of solid organic waste, sulfur, and a liquefaction solvent to a temperature of 300° F. to 1000° F. to provide asphaltic pitch-like compositions which are useful as paving binders and coating compositions. The method for producing paving compositions is compatible with current petroleum refining technology and affords a low-cost method of waste disposal.

10 Claims, No Drawings

ASPHALTIC PAVING COMPOSITIONS AND METHOD OF PREPARATION FROM SOLID ORGANIC WASTES

BACKGROUND OF THE INVENTION

1. Field of Invention

The invention relates to asphaltic compositions which are derived by thermally decomposing organic waste material and, more particularly, to a method for preparing asphalt compositions which are suitable for use as a binder material in the construction of asphalt paving structures.

2. Description of Prior Art

Pyrolysis processes are known for chemically converting organic materials to other useful chemical products. Aside from the conversion of raw materials, such as coal, consideration has been given to the conversion of solid organic wastes. See, for example, "Industrial Solid Wastes Management," pages 356–406, the Proceedings of the National Industrial Solid Wastes Management Conference, sponsored by the University of Houston and Bureau of Solid Waste Management on Mar. 24–26, 1970.

It is also known that agriculture is one of the largest single sources of potentially useful carbohydrate type wastes. Recent progress on the conversion of agricultural wastes to an industrial fuel oil is described in *Symposium: Processing Agricultural and Municipal Wastes*, edited by G. E. Inglett, published in Westport, Connecticut by the Avi Publishing Company, Inc., 1973. In Table 8.3, page 90, bovine manure is converted to oil in the presence of anthracene oil solvent.

U.S. Pat. No. 3,338,849 discloses the incorporation of waste material, i.e., reclaimed rubber, into asphalt composition for use in paving roads and other surfaces. Scrap polyethylene is used to increase the dispersibility of the rubber in the asphalt.

U.S. Pat. No. 3,960,793 discloses blending "reject polypropylene," a waste product, with asphalts to produce adhesives and molding compositions. The asphalts may be treated with sulfur or halogen-containing materials to increase their consistency.

Given the proliferation of used rubber tires, plastic and paper packaging materials, one-way plastic and paper containers, by-product and substandard polymers, solid organic wastes generally, and the like, improved methods of recovering potential hydrocarbon values contained therein are needed, particularly in view of the increasing scarcity of oil and natural gas. The valuable hydrocarbons in such materials would be better utilized if an economically attractive method could be devised for transforming them into useful liquid, solid and/or gaseous hydrocarbon products having utility as fuel or as substitutes for petroleum-derived raw materials.

SUMMARY OF THE INVENTION

Solid organic wastes such as municipal garbage, plastics, papers, wood, rubber, etc., are mixed with up to 50 percent by weight sulfur and slurried in selected petroleum-derived solvents. The mixture is heated at temperatures within the range from about 300° to 1000° F. for a period of time sufficient to partially or completely dissolve and decompose the organic wastes. Thermal decomposition in the liquid phase yields a composition which upon cooling to ambient temperatures (25° C.) has an asphaltic, pitch-like consistency. To facilitate dissolution of the organic waste, thermally-stable selected petroleum fractions such as catalytic cracker recycle feed, FCC main column bottoms, and TCC snytower bottoms are employed.

The liquid phase pyrolysis of solid organic wastes as described herein avoids the traditional methods of waste disposal heretofore employed. In past practices, waste disposal was achieved by burying on land, dumping at sea or burning. Each method of waste disposal thus contributed to pollution of the environment. By the liquid phase pyrolytic disposal method of the present invention waste disposal is achieved without polluting the environment and useful products are obtained which have economic value.

DETAILED DESCRIPTION OF THE INVENTION

For purposes of definition the term "waste" refers to anything that anybody discards and the term "solid organic waste" refers to any organic waste in solid or semi-solid form. "Garbage" is food waste. "Rubbish" is solid waste minus garbage. "Scrap" is any sort of fragment or leftover-scrap material is generally included within the scope of the term "waste" as it is used herein.

The present invention is a method of disposing of solid organic wastes. "Disposal" includes both stowing away wastes somewhere and converting them to something else. Thus, the present process is more specifically described as a disposal method of the latter type; it is a method of disposing of solid organic wastes by converting them to something else. The solid organic wastes which are converted by the disposal process of this invention generally include municipal garbage and certain refuse and agricultural wastes and more specifically include rubbers and plastics, paper, and wood.

Municipal solid organic waste materials include garbage, rubbish, and sewage sludge. The composition of municipal waste consists substantially of carbohydrate products such as cardboard, newsprint and other forms of paper. Excluding moisture, metals and siliceous materials, the carbohydrate content of municipal refuse is usually above 90 percent. Table I illustrates the content of a typical municipal waste composition. The Table I data is by Kaiser, E. R., "Refuse Reduction Process" reported in "Proceedings, the Surgeon General's Conference on Solid Waste Management for Metropolitan Washington," U.S. Public Health Service Publication No. 1729, Government Printing Office, Washington, D.C., July 1967, page 93.

Table I

| East Coast Municipal Waste Composition | | | |
|---|---|---|---|
| Cardboard | 7% | Moisture | 28.0% |
| Newspaper | 14% | Carbon | 25.0% |
| Miscellaneous Paper | 25% | Hydrogen | 3.3% |
| Plastic Film | 2% | Oxygen | 21.1% |
| Leather, molded | | Nitrogen | 0.5% |
| plastics, rubber | 2% | Sulfur | 0.1% |
| Garbage | 12% | Glass, ceramics | |
| Grass and dirt | 10% | stone | 9.3% |
| Texiles | 3% | Metals | 7.2% |
| Wood | 7% | Ash, other | |
| | | inerts | 5.5% |
| Glass, ceramics, | | | |
| stone | 10% | | |
| Metallics | 8% | | |
| Total | 100% | Total | 100.0% |

Solid organic agricultural wastes are derived in the form of wheat straw, rice straw, rye straw, maize husks and stalks, sugar cane bagasse, and other cellulosic agricultural byproducts.

Plastics disposed of by the present invention fall into various categories. Generally, the plastics employed are dictated by their commercial importance. For instance, it has been found that a typical plastics waste for disposal comprises on the average approximately 50 percent polyvinyl chloride, approximately 30 percent polystyrene, and the remaining approximately 20 percent various other plastics such as polyethylene, polypropylene, polyesters, polyacrylics, and the like. Thus, for the most part waste plastics fall into three important categories: poly(halogenated hydrocarbons), poly(straight-chain olefins), and poly(vinyl aromatics). The representative and most commercially important members of these three categories are polyvinyl chloride, polyethylene, and polystyrene, respectively.

The word "rubber" as used herein shall be understood to mean natural and synthetic rubbers and includes plantation rubber, thiokols, neoprenes, nitrile rubbers, styrene rubbers, butyl rubbers, polybutadiene, silicone rubbers, acrylate rubbers, polyurethanes, fluororubbers, etc.

The rubbers and plastics to be treated by this invention encompass a wide variety of solid polymeric materials. The properties of these materials vary widely, depending on compounding, fabrication, thermal history, and many other variables. It is apparent that not all of these materials can be dissolved in the petroleum-derived streams employed in the process of this invention. However, dissolution, while preferred is not necessary to the operability of the process. The dispersal of the rubber and plastics in the petroleum medium, for example, will normally produce desirable pitch-like products. Nevertheless, certain polymeric materials are so resistant to decomposition that it is desirable to avoid using them as feeds. Generally, such materials may be described as thermosetting resins, i.e., resins subject to crosslinking reactions at temperatures necessary to induce flow so that the ability to flow is rather quickly lost in favor of form stability.

It is an advantage of the present invention process that the solid organic waste material does not require extensive pretreatment before admixture with the petroleum solvent medium. A solid urban waste or agricultural waste is subjected to a shredding and macerating procedure and then is introduced directly into the invention disposal system. However, the solid waste feed should be free of inorganic waste materials such as siliceous wastes (e.g., glass and ceramics) and metals. If the waste material feed is soluble in the petroleum oil, the inorganic, insoluble components in the petroleum oil/waste composite can be separated by filtration, centrifugation, sedimentation, or other known solids-liquid separation techniques after dissolution of the solid organic wastes. Moreover, metals separation may be conveniently effected by subjecting the comminuted solid organic waste to a magnetic separation step prior to slurrying the waste with coker feed or other selected refinery petroleum fractions.

If more elaborate pretreatment of the solid waste feed is advantageous, a gross separation of combustible and noncombustible materials can be effected by methods and equipment known in the art. Suitable solid waste pretreatment systems are described in U.S. Pat. No. 3,714,038 and U.S. Pat. No. 3,933,577. In a typical system, solid waste is admixed with water and subjected to a pulping action. The effluent slurry is then passed through liquid cyclone and course screen zones to remove glass, stone, and metal material and the like. The pulp slurry is dewatered prior to processing according to the present invention.

Liquefaction of solid organic waste is accomplished according to the present invention by slurrying the waste in a petroleum-derived solvent together with 0.5 to 50 percent, preferably 20 to 40 percent by weight, based on the waste material, of sulfur or a sulfur containing material. The amount of solvent employed ranges between 0.5 and 10 parts by weight per part by weight of waste material. The preferred amount ranges between 1.0 to 5 parts by weight of solvent per part by weight of waste.

The mixture is heated at a temperature within the range from about 300° to 1000° F. for a period of time sufficient to at least partially dissolve the solid waste. Preferably, the slurry is heated at a temperature within the range from about 500° to 750° F. In this embodiment since the heating and mixing step is carried out at 300° F. or above, the dissolution is accomplished by the evolution of hydrogen sulfide. Because it is environmentally desirable to reduce these sulfide emissions, from 0.05 to 0.5 percent by weight of a hydrogen sulfide suppressant can be added as described in U.S. Pat. No. 3,960,585.

The slurry is heated for a period of time sufficient to yield a heavy oil or pitch-like composition. The liquefaction step is usually carried out for a period of time between 0.2 and 3 hours and preferably between about 0.5 to 1.5 hours until substantially all the waste is dissolved. Employment of a closed system under moderate or high pressures is not necessary. Nor is it necessary to contact the slurry with a reducing gas such as hydrogen or synthesis gas. Slurrying and heating can be conducted in an open reactor system at atmospheric pressure and without the use of catalysts or promoters.

The resulting mixture of waste and solids is separated by conventional methods such as filtration, centrifugation or a similar operation. It is desirable to maintain the separation zone at a temperature between about 200° F. and 500° F. during the liquid-solids separation step.

The sulfur may be used in the form of molten sulfur, sulfur powder, colloidal sulfur or in any other convenient form, e.g., sulfur monochloride, polysulfides, alkylpolysulfides, and modified reaction products of sulfur with organic compounds such as dicyclopentadiene, styrene, and the like. It is not necessary that the sulfur be melted. To avoid the generation of hydrogen sulfide, the process may be carried out by mixing the waste material and solvent, heating the mixture to effect intimate mixture and dissolution of the reactants, allowing the mixture to cool to below about 300° F., e.g., 100° to 250° F.; and then adding the sulfur component.

By the term "thermally stable" refinery petroleum fractions is meant a highly aromatic residuum such as fluidized catalytic converter (FCC) "main column" bottoms or thermofor catalytic converter (TCC) "syntower" bottoms which contain a substantial proportion of polycyclic aromatic hydrocarbon constituents such as napthalene, dimethylnapththalene, anthracene, phenanthrene, fluorene, chrysene, pyrene, perylene, diphenyl, benzothiophene, and the like. Such refractory petroleum media are resistant to conversion to lower molecular products by conventional non-hydrogenative procedures. Typically, these petroleum refinery residua and recycle fractions are hydrocarbonaceous mixtures having an average carbon to hydrogen ratio above about 1:1, and a boiling point between above about 450° F. and 1100° F.

The petroleum solvents especially suitable for the practice of the present invention process are thermally stable, highly polycyclic aromatic mixtures which result from one or more petroleum refining operations. Representative heavy petroleum solvents include FCC main tower bottoms, TCC syntower bottoms, asphaltic material, alkane-deasphalted tar, coker gas oil, heavy cycle oil, FCC main tower clarified slurry oil, mixtures thereof, and the like.

The nominal properties of suitable petroleum solvents are as follows:

| Syntower Bottoms | |
|---|---|
| Sulfur | 1.13% |
| Nitrogen | 450 ppm |
| Pour Point | 50° F. |
| Initial Boiling Point | 489° F. |
| 95% Point | 905° F. |
| Conradson Carbon | 9.96 |
| FCC Clarified Slurry Oil | |
| Sulfur | 1.04% |
| Nitrogen | 4400 ppm |
| Pour Point | 50° F. |
| Initial Boiling Point | 470° F. |
| 95% Point | 924° F. |
| Conradson Carbon | 10.15 |
| Heavy Cycle Oil | |
| Sulfur | 1.12% |
| Nitrogen | 420 ppm |
| Initial Boiling Point | 373° F. |
| 95% Point | 752° F. |
| Conradson Carbon | 10.15 |

A FCC main column bottoms refinery fraction is a highly preferred solvent for the practice of the present invention process. A typical FCC main column bottoms (or FCC clarified slurry oil) contains a mixture of chemical constituents as represented in the following mass spectrometric analysis:

| Compounds | Aromatics | Naphthenic/Aromatics | Labile $H_2$ % |
|---|---|---|---|
| Alkyl-Benzene | 0.4 | | 0 |
| Naphthene-Benzenes | | 1.0 | 0.03 |
| Dinaphthene-Benzenes | | 3.7 | 0.16 |
| Naphthalenes | 0.1 | | 0 |
| Acenaphthenes, (biphenyls) | | 7.4 | 0.08 |
| Fluorenes | | 10.1 | 0.11 |
| Phenanthrenes | 13.1 | | |
| Naphthene-phenonthrenes | | 11.0 | 0.18 |
| Pyrenes, fluoranthenes | 20.5 | | 0 |
| Chrysenes | 10.4 | | 0 |
| Benzofluoranthenes | 6.9 | | 0 |
| Perylenes | 5.2 | | 0 |
| Benzothiophenes | 2.4 | | |
| Dibenzothiophenes | 5.4 | | |
| Naphthobenzothiophenes | | 2.4 | 0.04 |
| Total | 64.4 | 35.6 | 0.60 |

A typical FCC main column bottoms has the following nominal analysis and properties:

| Elemental Analysis, Wt. %: | |
|---|---|
| C | 89.93 |
| H | 7.35 |
| O | 0.99 |
| N | 0.44 |
| S | 1.09 |
| Total | 99.80 |
| Pour Point, °F.: 50 | |

| -continued | |
|---|---|
| CCR, %: 9.96 | |
| Distillation: | |
| IBP, °F.: 490 | |
| 5%, °F.: 800 (est.) | |
| 95%, °F.: 905 | |

FCC main tower bottoms are obtained by the catalytic cracking of gas oil in the presence of a solid porous catalyst. A more complete description of the production of this petroleum fraction is disclosed in U.S. Pat. No. 3,725,240.

A FCC main column bottoms is an excellent liquefaction solvent medium for solid organic waste solubilization because it has a unique combination of physical properties and chemical constituency. A critical aspect of solvating ability is the particular proportions of aromatic and naphthenic and paraffinic moieties characteristic of a prospective liquefaction solvent. A high content of aromatic and naphthenic structures in a solvent is a criterion for high solvating ability for solid organic waste liquefaction.

The solvating ability of a solid organic waste liquefaction solvent can be expressed in terms of specific types of hydrogen content as determined by proton nuclear magnetic resonance spectral analysis. Nuclear magnetic resonance characterization of heavy hydrocarbon oils is well developed. The spectra (60μ c/sec) are divided into four bonds ($H_\alpha$, $H_\beta$, $H_\gamma$ and $H_{Ar}$) according to the following frequencies in Hertz (Hz) and chemical shift (δ):

| | $H_\alpha$ | $H_{62}$ | $H_{65}$ | $H_{Ar}$ |
|---|---|---|---|---|
| Hz | 0–60 | 60–100 | 120–200 | 360–560 |
| δ | 0–1.0 | 1.0–1.8 | 2.0–3.3 | 6.0–9.2 |

The $H_{Ar}$ protons are attached to aromatic rings and are a measure of aromaticity of a solvent. $H_\alpha$ protons are attached to non-aromatic carbon atoms attached directly to an aromatic ring structure, e.g., alkyl groups and naphthenic ring structures. $H_\beta$ protons are attached to carbon atoms which are in a second position away from an aromatic ring, and $H_\gamma$ protons are attached to carbon atoms which are in a third position or more away from an aromatic ring structure.

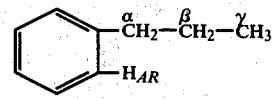

The $H_{Ar}$ protons are important because of their strong solvency power. A high content of $H_\alpha$ protons is particularly significant in a liquefaction solvent, because $H_\alpha$ protons are labile and are potential hydrogen donors in a solid organic waste liquefaction process. $H_\beta$ and $H_\gamma$ protons are paraffinic in nature and do not contribute to the solvating ability of a liquefaction solvent.

It is particularly preferred that the FCC main column bottoms employed as a solid organic waste liquefaction solvent in the present invention process has a hydrogen content distribution in which the $H_{Ar}$ proton content is between about 30 and 50 percent, the $H_\alpha$ proton content is at least about 30 percent and the $H_\alpha/H_\beta$ proton ratio is above about 1.4. Concomitantly it is desirable that the $H_\beta$ proton content is below 20 percent and the $H_\gamma$ proton content is below 13 percent. It is preferred that the highly aromatic hydrocarbon solvent component of this invention be a highly aromatic refinery petroleum residuum solvent having the above hydrogen content distribution and especially preferred that the highly aromatic refinery petroleum residuum solvent be selected from the group consisting of FCC main column bottoms and TCC syntower bottoms.

Petroleum solvents possessing the desired hydrogen content distribution are obtained as a bottoms fraction from the catalytic cracking or hydrocracking of gas oil stocks in the moving bed or fluidized bed reactor processes. In general depending upon such conditions as temperature, pressure catalyst-to-oil ratio, space velocity and catalyst nature, a high severity cracking process results in a petroleum residuum solvent having an increased content of $H_{Ar}$ and $H_\alpha$ protons and a decreased content of the less desirable $H_\beta$ and $H_\gamma$ protons.

The proton distribution in examples of various highly aromatic hydrocarbon by-product streams are shown below.

| Example | $H_\alpha$ | $H_\beta$ | $H_\gamma$ | $H_{Ar}$ | $H_\alpha/H_\beta$ |
|---|---|---|---|---|---|
| FCC/MCB | | | | | |
| #1 | 36.0 | 19.3 | 12.7 | 32.0 | 1.87 |
| #2 | 36.4 | 13.6 | 5.2 | 44.8 | 2.68 |
| #3 | 18.5 | 50.0 | 14.3 | 17.1 | 0.37 |
| #4 | 18.1 | 48.8 | 18.9 | 14.2 | 0.37 |
| TCC/Syntower Bottoms | | | | | |
| #1 | 29.8 | 20.9 | 7.9 | 41.4 | 1.42 |
| #2 | 16.3 | 48.1 | 20.0 | 15.6 | 0.35 |
| Clarified Slurry Oil | 19.4 | 48.5 | 16.5 | 15.5 | 0.40 |
| Agha Jari Resid (850+° F.) | 12.0 | 60.0 | 24.0 | 5.0 | 0.20 |
| SRC Recycle Oil | 27.1 | 14.7 | 6.9 | 46.3 | 1.84 |
| Coal Tar | 5. | — | — | 91. | — |

From the foregoing it may be seen that hydrocarbons having the same general process derivation may or may not have the desired proton distribution identified in the foregoing discussion. For example, FCC/MCB #1 and #2 have the desired proton distribution while FCC/MCB #3 and #4 do not.

Furthermore, although the highly aromatic petroleum residuum solvent component of this invention is derived from petroleum, it may be noted in the above table that SRC recycle solvent closely resembles FCC/MCB #1 and #2, particularly in the $H_\alpha/H_\beta$ ratio. The following table from an article entitled "Recycle Solvent Techniques for the SRC Process," by R. P. Anderson, appearing in *Coal Processing Technology*, Volume 2 Am. Inst. of Chem. Engr., pages 130–32 (1975), shows that some SRC recycle solvents may conform to the hydrogen distribution requirements of the highly aromatic petroleum residuum solvent component of the present invention. Shown in the table are the hydrogen distribution changes which occur during multiple passes of recycle solvent through the coal extraction step of an SRC process. The initial solvent employed was Gulf Carbon Black Feedstock FS 120.

| | $H_\alpha$ | $\beta$ | $H_\gamma$ | $H_\gamma$ | $H_\alpha/H_\beta$ |
|---|---|---|---|---|---|
| Gulf FS 120 | 29.7 | 31.4 | 9.2 | 29.7 | 0.94 |
| Pass 1 | 30.8 | 30.2 | 8.2 | 30.8 | 1.02 |
| 2 | 31.3 | 28.4 | 7.1 | 33.2 | 1.10 |
| 10 | 30.0 | 18.8 | 4.7 | 46.5 | 1.60 |
| 11 | 29.8 | 18.8 | 4.9 | 46.5 | 1.58 |
| | $H_\alpha$ | $\beta$ | $H_\gamma$ | $H_\gamma$ | $H_\alpha/H_\beta$ |
| Raw Anthracene Oil | 18.9 | 3.4 | 0.6 | 77.1 | 5.6 |
| Partially Hydrogenerated Anthracene Oil | 20.5 | 8.6 | 1.6 | 69.3 | 2.4 |
| Anthracene Oil Recycle | 23.3 | 15.2 | 4.7 | 56.7 | 1.53 |

As solvent is successively recycled through the coal extraction step of a solvent extraction process for converting coal to more valuable products, it takes on the characteristics of the coal being processed and, thus, its solvating ability is improved.

A surprising aspect of the present invention is the discovery that the highly aromatic petroleum residuum solvent component has characteristics remarkably similar to coal-derived solvents which may be recovered only after multiple passes through the coal extraction step of a solvent refining process and, furthermore, that the petroleum residuum solvent component has superior solvating ability for coal.

The asphalt compositions of the present invention provide a penetration value in the range of about 40–300 (ASTM D 5–49) and thus are suitable for use as paving binders in known or more conventional asphalt road building practice. If required, the hardness of the present invention asphalt composition can be modified by air-blowing, and either with or without the presence of a catalyst such as phosphorus pentoxide or zinc chloride. The preferred invention asphalt compositions have a ring and ball softening point in the range of about 150° F. to 185° F., and a ductility of more than 100 centimeters at 77° F. (ASTM D 113–44).

Road paving asphalts as known in the art are graded according to penetration values at 77° F. as measured by the standard method of test for penetration of bituminous materials (ASTM D 5–52), the penetration values being measured as the tenths of a millimeter that a tapered standard needle (0.14 to 0.16 mm tip diameter) will penetrate the asphalt in five seconds with a 100 gram load. The overall acceptable penetration range for various asphalt binders used is from 40 to 300. The range 40–70 is generally for asphalt used in hot climates, 70–110 generally for temperate climates, and 110–300 generally for cold climates.

The following example illustrates the best mode now contemplated for carrying out the invention.

EXAMPLE I 148.4 g Douglas Fir sawdust, sieved to pass 12 mesh, containing (4.8% moisture), and 296.8 g FCC main column bottoms were charged to a 1-liter stirred autoclave. The temperature was brought to 650° F. and held for 1 hour (the final pressure reaching 1700 psig). 99.4 weight percent of the wood (m.a.f.) was converted to:

| | wt. % |
|---|---|
| Pyridine solubles | 59.2 |
| Gas | 8.2 |
| Water | 32.0 |
| | 99.4, | while 0.6 percent remained as unreacted wood or carbon.

The final product (pyridine-soluble fraction) was blended with 10, 20, and 50 weight percent sulfur, placed in covered containers, blanketed with nitrogen gas and heated to 300° F. for 15 minutes. After cooling the products were ductile, smooth, semi-solids similar in appearance to petroleum asphalt binders.

Using the general procedure of Example I, 20 percent sulfur can be blended with solid organic waste dissolved in the following manner. The sulfur is blended after cooling the reaction product to 100° F.

EXAMPLE II

Waste newsprint was comminuted and solubilized in a FCC main column bottoms in accordance with the present invention process. The reaction conditions and the product yields of the process were as follows:

| Operating Conditions | Paper |
|---|---|
| Temperature, °F. | 600 |
| Time, hours | 1 |
| Initial Press, psig | 0 |
| Solvent/Feed, wt/wt | 3/2 |
| Conversion, wt %[a] | 94 |
| Product Yield, wt %[b] | |
| Benzene Soluble | 10.0 |
| Benzene Insoluble | 42.6 |
| (Liquid Product) | (52.6) |
| Gas | 14.3 |
| Water | 27.2 |
| Unreacted | 5.9 |
| | 100 |

[a] m.a.f. paper or wood.
[b] calculated on solvent-free basis.

EXAMPLE III

Used whole tire was dissolved in FCC heavy cycle oil at 650° F. in 1 hour. No gaseous product was produced.

EXAMPLE IV

Polyethylene bag was dissolved in FCC heavy cycle oil at about 400° F. in 20 minutes. No gaseous product was formed.

EXAMPLE V

Polystyrene foam was dissolved in FCC light cycle oil at 150° F. in 10 minutes. When the polystyrene concentration was increased to 40 percent by weight, the resulting solution became highly viscous.

EXAMPLE VI

Whole tire was first dissolved in heavy cycle oil. Dunlop tire (rubber and fibre only) was shredded. Tire (75 grams) and FCC heavy cycle oil (HCO) (75 grams) were then heated in a stirred autoclave for 3 hours at 575° F. The tire completely dissolved to give a pasty material.

What is claimed is:

1. A process for liquefaction of solid organic waste material to provide asphaltic compositions suitable for use as paving binders which comprises forming a slurry of comminuted solid organic waste with sulfur and a petroleum solvent having a boiling point between about 450° F. and 1100° F. which has
   (a) an $H_{Ar}$ proton content between about 30 and 50 percent,
   (b) a $H_\alpha$ proton content of at least 30 percent,
   (c) a $H_\beta$ proton content below 20 percent,
   (d) a $H_\gamma$ proton content below 13 percent, and
   (e) a $H_\alpha/H_\beta$ proton ratio above about 1.4;
heating the slurry at a temperature in the range between about 300° F. and 1000° F. for a period of time sufficient to dissolve the slurry, and thereafter recovering a flowable heavy oil having a pitch-like consistency.

2. A process in accordance with claim 1 wherein the amount of solvent is in the range between about 0.1 and 0.5 parts by weight per part by weight of waste and the sulfur is present in an amount ranging from 0.5 to 50 percent by weight.

3. A process in accordance with claim 1 wherein the petroleum solvent is a FCC main column bottoms.

4. A process in accordance with claim 1 wherein the petroleum solvent is a TCC syntower bottoms.

5. A process in accordance with claim 3 wherein the solid organic waste is municipal refuse.

6. A process in accordance with claim 3 wherein the solid organic waste is wood.

7. A process in accordance with claim 3 wherein the solid organic waste is agricultural cellulosic byproduct.

8. A process in accordance with claim 3 wherein the solid organic waste is newsprint and cardboard.

9. The composition produced by the method of claim 3.

10. A process for liquefaction of solid organic waste material to provide asphaltic compositions suitable for use as paving binders which comprises forming a slurry of comminuted solid organic waste and a petroleum solvent having a boiling point between about 450° F. and 1100° F. which has
    (a) an $H_{Ar}$ proton content between about 30 and 50 percent,
    (b) a $H_\alpha$ proton content of at least 30 percent,
    (c) a $H_\beta$ proton content below 20 percent,
    (d) a $H_\gamma$ proton content below 13 percent, and
    (e) a $H_\alpha/H_\beta$ proton ratio above about 1.4;
heating the slurry at a temperature in the range between about 300° F. and 1000° F. for a period of time sufficient to dissolve the slurry, cooling the mixture to below about 300° F., adding from 0.5 to 50 percent by weight sulfur to said mixture, and thereafter recovering a flowable heavy oil having a pitch-like consistency.

* * * * *

UNITED STATES PATENT AND TRADEMARK OFFICE
CERTIFICATE OF CORRECTION

PATENT NO. : 4,177,079  Page 1 of 2
DATED : December 4, 1979
INVENTOR(S) : Wilton F. Espenscheid It is certified that error appears in the above—identified patent and that said Letters Patent is hereby corrected as shown below:

Col. 2, line 4 - "snytower" should read "syntower"

Col. 6, line 35 - "$H_{62}$" should read "$H_\beta$" and "$H_{65}$" should read "Hy"

Col. 7, line 64 - The following table:

|  |  | $H_\alpha$ | $\beta$ | $H_\gamma$ | $H_\gamma$ | $H_\alpha/H\beta$ |
|---|---|---|---|---|---|---|
| Gulf FS 120 |  | 29.7 | 31.4 | 9.2 | 29.7 | 0.94 |
|  | Pass 1 | 30.8 | 30.2 | 8.2 | 30.8 | 1.02 |
|  | 2 | 31.3 | 28.4 | 7.1 | 33.2 | 1.10 |
|  | 10 | 30.0 | 18.8 | 4.7 | 46.5 | 1.60 |
|  | 11 | 29.8 | 18.8 | 4.9 | 46.5 | 1.58 | should read as follows:

UNITED STATES PATENT AND TRADEMARK OFFICE
CERTIFICATE OF CORRECTION

PATENT NO. : 4,177,079

DATED : December 4, 1979

INVENTOR(S) : Wilton F. Espenscheid

It is certified that error appears in the above—identified patent and that said Letters Patent is hereby corrected as shown below:

|  | $H_\alpha$ | $H_\beta$ | $H_\gamma$ | $H_{Ar}$ | $H_\alpha/H_\beta$ |
|---|---|---|---|---|---|
| Gulf FS 120 | 29.7 | 31.4 | 9.2 | 29.7 | 0.94 |
| Pass 1 | 30.8 | 30.2 | 8.2 | 30.8 | 1.02 |
| 2 | 31.3 | 28.4 | 7.1 | 33.2 | 1.10 |
| 3 | 29.9 | 26.7 | 7.4 | 36.0 | 1.12 |
| 4 | 30.3 | 24.7 | 6.9 | 38.1 | 1.23 |
| 5 | 30.1 | 23.9 | 6.2 | 39.8 | 1.26 |
| 6 | 28.8 | 22.3 | 7.0 | 41.9 | 1.29 |
| 7 | 28.7 | 21.2 | 6.3 | 43.8 | 1.35 |
| 8 | 29.4 | 20.1 | 5.8 | 44.7 | 1.46 |
| 9 | 29.7 | 19.3 | 4.9 | 46.1 | 1.54 |
| 10 | 30.0 | 18.8 | 4.7 | 46.5 | 1.60 |
| 11 | 29.8 | 18.8 | 4.9 | 46.5 | 1.58 |

Signed and Sealed this

Second Day of September 1980

[SEAL]

Attest:

Attesting Officer

SIDNEY A. DIAMOND

Commissioner of Patents and Trademarks